(12) United States Patent
McLean

(10) Patent No.: US 12,301,125 B2
(45) Date of Patent: May 13, 2025

(54) POWER CONVERTER TOPOLOGY

(71) Applicant: Hamilton Sundstrand Corporation, Charlotte, NC (US)

(72) Inventor: Andrew McLean, Halesowen (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 29 days.

(21) Appl. No.: 18/217,414

(22) Filed: Jun. 30, 2023

(65) Prior Publication Data
US 2024/0007008 A1 Jan. 4, 2024

(30) Foreign Application Priority Data
Jul. 4, 2022 (EP) .................................... 22275088

(51) Int. Cl.
*H02M 3/335* (2006.01)
*B60L 53/20* (2019.01)
(Continued)

(52) U.S. Cl.
CPC ......... *H02M 3/33592* (2013.01); *B60L 53/20* (2019.02); *H02M 1/0058* (2021.05);
(Continued)

(58) Field of Classification Search
CPC .. B60L 53/20; B60L 2200/10; B60L 2210/12; B60L 2210/14; H02M 1/0058;
(Continued)

(56) References Cited

U.S. PATENT DOCUMENTS 7,660,133 B1 * 2/2010 Hwang ............. H02M 3/33592
363/16
8,363,427 B2 * 1/2013 Anguelov ........... H02M 3/3376
363/21.02
(Continued)

FOREIGN PATENT DOCUMENTS

CN 102457187 A 5/2012
CN 107453612 A 12/2017
(Continued)

OTHER PUBLICATIONS

Extended European Search Report for European Patent Application No. EP22275088.7, dated Dec. 23, 2022.

*Primary Examiner* — Jared Fureman
*Assistant Examiner* — Michael J Warmflash

(57) ABSTRACT

A power converter topology, comprising: a cascade connection of a first converter stage and a second converter stage; wherein the first converter stage comprises a current mode controlled pulse width modulation (PWM) converter having one or more pairs of switches forming a first switching bridge and an inductor connected to the output of the first switching bridge, the switching bridge generating a voltage $V_{link}$; and wherein the second converter stage is a resonant converter having a switching stage having one or more pairs of switches forming a second switching bridge across the voltage $V_{link}$ generated by the first converter stage and a resonant tank connected to the output of the second switching bridge, to generate a resonator output voltage; the topology further comprising a transformer to transform the resonator output voltage to a transformed output voltage and a rectifier to rectify the transformed output voltage to an output voltage $V_{out}$, and wherein the duty cycle of the first switching bridge is varied according to a voltage derived
(Continued)

from the value of the output voltage $V_{out}$, and wherein the duty cycle of the second switching bridge is fixed at 50:50.

20 Claims, 2 Drawing Sheets

(51) Int. Cl.
*H02M 1/00* (2007.01)
*H02M 3/00* (2006.01)

(52) U.S. Cl.
CPC ........... *H02M 3/01* (2021.05); *B60L 2200/10* (2013.01); *B60L 2210/12* (2013.01); *B60L 2210/14* (2013.01)

(58) Field of Classification Search
CPC ........ H02M 1/007; H02M 3/01; H02M 3/155; H02M 3/33571; H02M 3/33592; H02M 3/00; H02M 3/158; Y02B 70/10
See application file for complete search history.

(56) References Cited

U.S. PATENT DOCUMENTS

| | | | |
|---|---|---|---|
| 9,590,492 B2 * | 3/2017 | Chang | H02M 1/36 |
| 9,690,308 B2 * | 6/2017 | Taylor | H02M 3/156 |
| 2010/0118565 A1 * | 5/2010 | Stuler | H02M 3/33592 |
| | | | 363/21.08 |
| 2011/0317452 A1 * | 12/2011 | Anguelov | H02M 3/33592 |
| | | | 363/21.02 |
| 2014/0140113 A1 * | 5/2014 | Oh | H02M 1/4241 |
| | | | 363/89 |
| 2015/0263634 A1 * | 9/2015 | Fu | H02M 3/33592 |
| | | | 363/21.02 |
| 2018/0309372 A1 * | 10/2018 | Leong | H02M 3/33546 |
| 2021/0336540 A1 * | 10/2021 | Kumar | H02M 1/007 |
| 2022/0085728 A1 * | 3/2022 | Mantooth | H02M 1/0058 |

FOREIGN PATENT DOCUMENTS

| | | | | |
|---|---|---|---|---|
| EP | 2773035 A1 | 9/2014 | | |
| EP | 3267568 A1 | 1/2018 | | |
| EP | 3905495 A1 * | 11/2021 | ......... | H02M 1/0043 |
| JP | WO-2013099918 A1 | 7/2013 | | |

* cited by examiner

POWER CONVERTER TOPOLOGY

CROSS-REFERENCE TO RELATED APPLICATIONS

This application claims priority to and the benefit of European Patent Application No. 22275088.7, filed Jul. 4, 2022, the entire content of which is incorporated herein by reference.

TECHNICAL FIELD

The present disclosure relates to a power converter topology, specifically a resonant power converter topology.

BACKGROUND

Power converters are used in many applications to provide an appropriate level of power to drive one or more loads from a power source. The power can be inverted, converted, stepped up or stepped down, as required to drive the loads in question. Typically, a power converter for loads such as electronic devices, electrical vehicles and other loads will include a DC-DC stage to derive appropriate DC drive voltage output levels for the loads to be driven. In recent times, DC power converter or power distribution systems have overtaken AC power distribution systems in many applications e.g. in aircraft applications, especially as the trend has been to more electric aircraft (MEA) or all electric aircraft (AEA), due to their high efficiency and high power density (and thus lower weight and smaller size), among other things.

DC power distribution systems use a DC bus and the converter stage converts the bus voltage into suitable DC voltages for the loads to be driven. Higher and higher bus voltages are becoming possible in many applications, with the possibility of buses in e.g. aircraft applications increasing in the near future from 540 Vdc to 3 k Vdc. For high power applications, there is a trend to increase the bus voltage to reduce overall losses in the system. As DC bus voltages increase, there is an advantage in multilevel and modular power converters that can be easily adapted to the increased bus voltage.

Conventionally, PWM power converters operating in switched-mode operation were used for DC-DC conversion. Such converters, however, exhibit undesirable power dissipation during the switching interval caused by simultaneous voltage and current stress, which adversely impacts conversion efficiency.

More recently, and particularly with advances in semiconductor switching technology, resonant converters have been used to reduce switching losses and improve conversion efficiency. With resonant converters, the active switch device is switched with zero current or zero voltage at its terminals, thus significantly reducing switching losses. Very low switching losses can be achieved due to zero voltage transitions (ZVT) on the primary side and zero current switching (ZCS) on the secondary side of the converter. There are two main types of resonant converter—the series resonant converter and the parallel resonant converter, having an LC resonant tank used to create conditions for lossless turn-on and turn-off of the semiconductor switches.

To take advantage of these zero current or zero voltage capabilities, so as to minimise switching losses, the resonant converter is usually dimensioned to operate at its optimal operating frequency $f_s$, typically the resonant frequency of the LC circuit, where this zero switching occurs. The resonant tank circuit is typically configured so that for the whole load (output voltage) range, very little change in operating frequency is required, so as to always operate at around the optimal frequency to minimise the switching losses.

Although such resonant converters have many advantages, their high linearity between input voltage and output voltage means that if the input voltage varies over a wide range (in aircraft, for example, the input voltage range for a 540 Vdc bus may range from 400 to 750 Vdc) a high frequency variation is required to regulate the series resonant converter. The variable frequency penalises the overall design of the system.

When there is a large range of input voltages, the gain of the converter needs to change accordingly, to provide the desired output voltages and this causes a change in operating frequency. The shift in operating frequency can be significant depending on the input voltage range. Higher input voltages require a lower voltage gain which is provided by increased switching frequency. Conversely, lower input voltages require a higher gain provided by lower switching frequency. Changes in switching frequency, to achieve the required change in gain, because of changes in input voltage, mean that the resonance circuit is not always operating at its optimal frequency, which then loses the advantages provided by the zero voltage or zero current switching. It is, therefore, difficult to design power converters that minimise switching losses over the entire input voltage and load ranges.

This is a particular issue in aerospace and automotive fields, where significant voltage changes can occur due to electrical transients. When such changes occur, the power converter still has to operate reliably and so often, converters have to be designed to work over wider frequency ranges, so as not to sacrifice reliability, at the cost of increased losses, and also increased size and weight.

There is a need for a resonant power converter topology that enables simple and reliable control of the converter stage over a wide range of input voltages, with a reduced frequency range, to minimise losses.

SUMMARY

According to the disclosure, there is provided a power converter topology, comprising: a cascade connection of a first converter stage and a second converter stage; wherein the first converter stage comprises a current mode controlled pulse width modulation, PWM, converter having one or more pairs of switches forming a first switching bridge and an inductor ($L_{buck}$) connected to the output of the first switching bridge, the switching bridge generating a voltage $V_{link}$; and wherein the second converter stage is a resonant converter having a switching stage having one or more pairs of switches forming a second switching bridge across the voltage $V_{link}$ generated by the first converter stage and a resonant tank connected to the output of the second switching bridge, to generate a resonator output voltage; the topology further comprising a transformer to transform the resonator output voltage to a transformed output voltage and a rectifier to rectify the transformed output voltage to an output voltage $V_{out}$, and wherein the duty cycle of the first switching bridge is varied according to a current derived from the value of the output voltage $V_{out}$, and wherein the duty cycle of the second switching bridge is fixed at 50:50.

A power distribution system and control method are also provided as defined by the claims.

The topology and method of the disclosure enables the necessary gain to be provided for different input voltages whilst operating the converter at a fixed, optimal frequency to maximise zero current switching and hence reduce switching losses.

BRIEF DESCRIPTION

Examples according to the disclosure will now be described with reference to the drawings. It should be noted that variations are possible within the scope of the claims.

DETAILED DESCRIPTION

Figure 1:
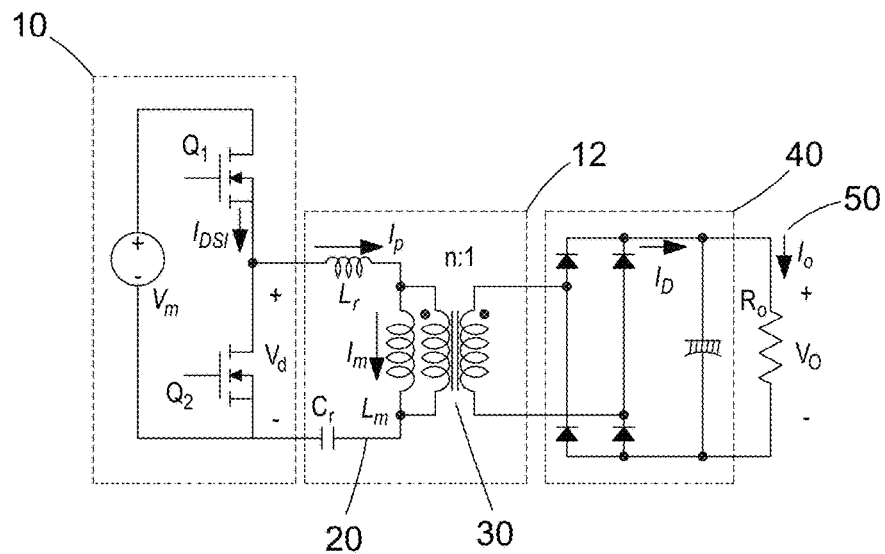
FIG. 1 shows a typical LLC resonant converter topology.

A DC-DC power converter generally consists of a DC distribution network including DC-DC converters and different DC loads having different power requirements. The DC converters implement voltage or current conversion to deliver the desired power to the loads. Various types of converter are known, but for many applications, resonant converters are preferred for the reasons discussed above. Resonant converters contain resonant networks including one or more inductors and one or more capacitors. Series resonant converters such as LLC power converters are used in various power source applications. A conventional LLC resonant converter for the DC-DC stage of a power converter is shown in FIG. 1 and includes a switching bridge, as a square wave generator a resonant network 12 including a resonant tank 20, here comprising a capacitor $C_r$ and inductors $L_r$ and $L_m$, and a transformer 30; a rectifier network 40 and a DC load output stage 50 with DC load $R_o$. The switching bridge comprises a number of series-connected semiconductor, e.g. MOSFET, switches Q1, Q2, connected across a DC Voltage bus $V_{in}$. In the example shown, the switching bridge is a half-bridge rectifier, but other forms of bridge with different numbers of switching stages, e.g. a full-bridge rectifier, may also be used. Also for simplicity, secondary-side rectifiers are represented by standard rectifier diodes, but the description that follows assumes synchronous rectification. The switching bridge, by switching the switches Q1, Q2, at a selected frequency by operation of a gate driver (not shown) will generate a square wave to excite the resonant tank 20.

Figure 2:
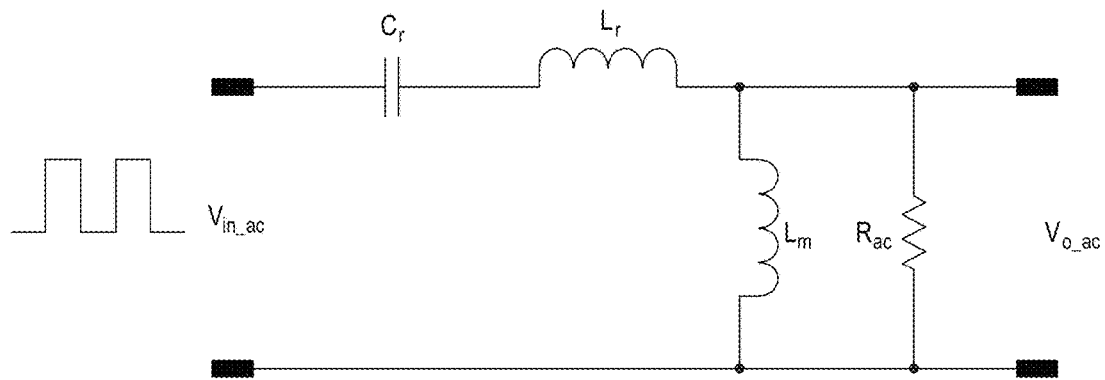
FIG. 2 shows an equivalent resonant tank circuit of a typical LLC resonant converter.

In this example, the resonant tank is represented as a series connected resonant capacitor Cr, leakage inductance $L_r$ and transformer magnetising inductance $L_m$, as shown in the equivalent circuit of FIG. 2.

The resonant tank 20 outputs a sinusoidal current from the input square wave $V_{in\_ac}$.

The transformer 30 receives the sinusoidal current from the resonant tank 20 and scales the current and voltage according to the ratio N of turns of the transformer coils. The stepped-down current is then rectified by the synchronous rectifier 40. The DC output stage 50, represented here as a load resistor R and parallel output capacitance, filters the rectified ac current to provide a DC output voltage.

The overall gain of the converter is equal to the product of the switching bridge gain, the resonant tank gain and the transformer ratio, i.e.:

$$\text{Gain} = K_{switching\_bridge} \times K_{resonant\_tank} \times K_{transformer}$$

-continued $$K_{switching\_bridge} = 0.5 \text{ (for Half Bridge)}$$

$$K_{transformer} = \frac{N_s}{N_p}$$

The resonant tank gain can be expressed as:

$$K_{resonant\_tank}(f, Q, m) =$$

$$\left|\frac{V_{o\_ac}(s)}{V_{in\_ac}(s)}\right| = \left|\frac{\left(\frac{\omega}{\omega_o}\right)^2 \cdot (m-1)}{\left(\frac{\omega^2}{\omega_p^2} - 1\right) + j\left(\frac{\omega}{\omega_o}\right) \cdot \left(\frac{\omega^2}{\omega_o^2} - 1\right) \cdot (m-1) \cdot Q}\right|$$

For a conventional LLC resonant converter as described above, the quality factor Q is dependent on the resonant frequency and inductance and the output power $P_o$ as well as the transformer ratio $N_s/N_p$ and output voltage $V_o$ according to the equation:

$$Q = \frac{\pi^3 f_r L_r P_o}{4n^2 V_o^2}$$

The LLC two-level series resonant converter as shown in FIG. 1 can be modified as in EP 2 262 088 to reduce switching losses using flying capacitors connected in different configurations across the switches of the multi-level converter and to provide fractions of the full available input voltage as output voltages, so as to provide the possibility of a range of output voltages. The use of capacitors, however, adds to the overall cost and size/weight of the system.

As mentioned above, in conventional resonant converters, output voltage regulation is achieved by adjusting the frequency of operation to take advantage of the resonant tank gain characteristics—i.e. the gain is adjusted by moving the operating frequency. This gives the ability to regulate the output voltage for a given input voltage or, alternatively, to achieve the same output voltage for varying input voltage. The problem, however, is that the secondary rectifier, 40, zero current switching, ZCS, operation is lost when the converter is operating at switching frequencies above resonance (i.e. when the input voltage is higher). If the rectifier is turning off at non-zero current, switching losses occur.

The present disclosure provides a cascaded converter that provides a range of output voltages whilst maintaining operation at an optimal switching frequency even if the input voltages vary, to operate the resonant stage at the optimum frequency and thereby minimise switching losses.

Figure 3:
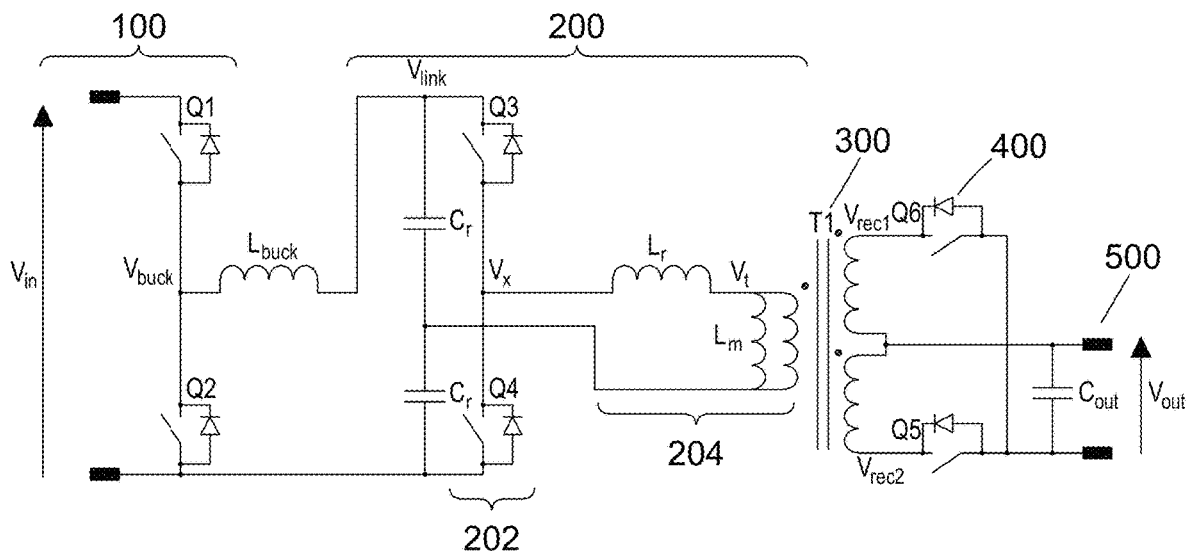
FIG. 3 shows a converter topology according to the disclosure.

The topology according to the disclosure, is shown in FIG. 3

As will be described further below, the topology of this disclosure means that for different input voltages, the required stable output voltages can be provided without having to change the switching frequency, and thus avoiding the problems associated with varying switching frequency.

Referring to FIG. 3, the topology of this disclosure includes a cascaded arrangement of a first converter stage 100 and a second converter stage 200. The first converter stage is a current-fed pulse width modulation (PWM) converter which may be e.g. a Buck or a Boost PWM converter. In the example shown, the first stage is a Buck PWM converter comprising first and second switches Q1, Q2 connected in series across the input voltage $V_{in}$ and an inductor $L_{buck}$. This stage 100 generates an increased or decreased input voltage $V_{link}$ for the second stage 200. Because the first stage is current fed, it is possible to omit a dedicated output capacitor here, this function being provided by Cr.

The second stage 200 is a resonant converter having a switching stage 202 and a resonance tank 204. In the example shown, the switching stage is a half-bridge with two switches—third switch Q3 and fourth switch Q4 connected in series but could be another configuration to provide switching, such as a full-bridge. The resonant tank, in this example, is an LLC resonance tank similar to that described above with inductors $L_r$ and $L_m$ and capacitor $C_r$. As in the conventional topology described above, this stage provides a voltage to a transformer 300 and the output from the transformer is rectified, by the rectifier stage 400 providing output voltage $V_{out}$ at output stage 500. As this rectifier is current-fed, a DC-link capacitor $C_{out}$ will also be required. The rectifier here is shown as fifth and sixth switches Q5, Q6 although other rectifier configurations as are known in the art can be used.

The operation of the topology of this disclosure is such that the second converter stage—the resonant converter—operates at the resonant frequency $f_r$, switching with 50:50 duty cycle regardless of input or output voltage and, therefore, retains the zero current switching at the secondary side. The first stage, however, operates at the same frequency $f_r$ but with a variable duty cycle based on the output voltage $V_{out}$—i.e. the output voltage $V_{out}$ is sensed and this is used to modulate the duty cycle of the current mode controlled PWM converter stage. Thus voltage variations are effectively compensated in the first stage by a corresponding variation of the duty cycle of the switches Q1, Q2 of that stage resulting in the input voltage $V_{link}$ that is provided to the second stage being set according to $V_{out}$ and no longer varying. The second stage then switches at a fixed frequency with a 50:50 duty cycle, for the switches Q3, Q4. Without this cascaded configuration, an increase in input voltage to the system e.g. due to perturbations or transients from the system environment, would lead to an increase in output voltage unless the converter gain were changed by changing the switching frequency. The adjusted duty cycle of the first stage of the topology of this disclosure compensates for a change in input voltage to maintain the desired output voltage without having to change the switching frequency. The resonant converter, being the second stage 200, thus operates at its optimal point and regulates the conversion by its input voltage $V_{link}$ being adapted using the first stage 100.

Figure 4:
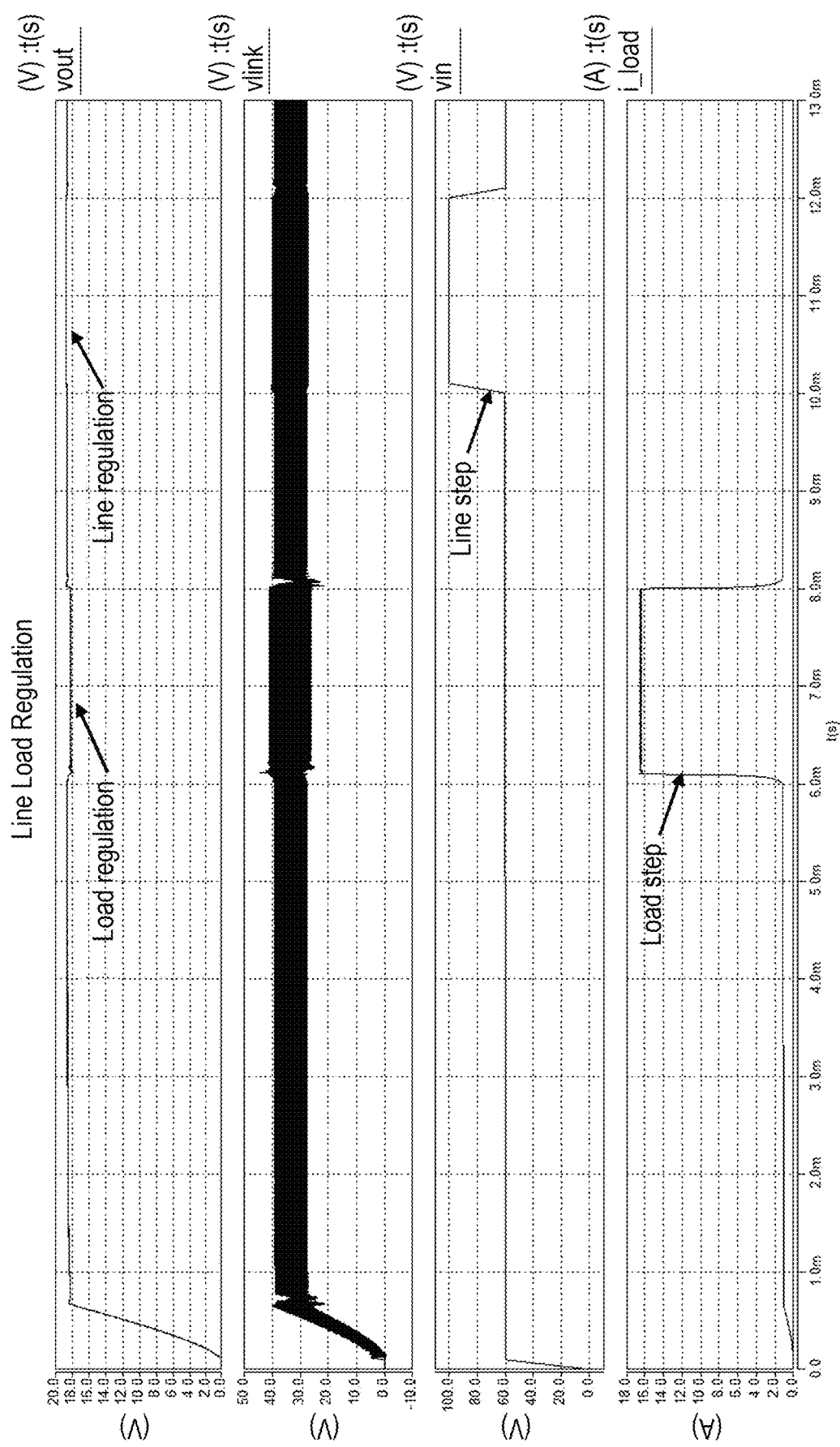
FIG. 4 illustrates typical waveforms for a topology according to the disclosure.

For a nominal converter input voltage $V_{in}$, therefore, the duty cycle of the first stage will depend on the converter output voltage $V_{out}$, with a corresponding current being used to control the duty cycle for switching switches Q1 and Q2. The variable duty cycle will generate the input voltage $V_{link}$ for the second stage which will then operate as a resonant converter as described above for a fixed input voltage. The resonant converter stage can, therefore, be designed to operate at its optimal, resonant frequency, with ZCS. The behaviour of the topology described above is illustrated by the waveforms of FIG. 4.

In this way, it is possible to use a simple single-ended current mode controller to drive the first stage 100 and to drive the second stage with a fixed 50:50 duty cycle, and design of the converter is, therefore, relatively simple.

The converter can operate over a wide input voltage range.

This configuration has particular advantages in applications vulnerable to large changes in input voltage e.g. in the aerospace or automotive fields but where power density is an important factor and switching losses should be minimised. Applications include, but are not limited to, power distribution, air management systems, electric aircraft propulsion, actuation and fuel pumping.

The invention claimed is:

1. A power converter topology, comprising:
a cascade connection of a first converter stage and a second converter stage, wherein:
the first converter stage comprises a current mode controlled pulse width modulation (PWM) converter having one or more pairs of switches forming a first switching bridge and an inductor connected to an output of the first switching bridge, the first switching bridge configured to generate a voltage $V_{link}$; and
the second converter stage comprises a resonant converter with a switching stage having one or more pairs of switches forming a second switching bridge across the voltage $V_{link}$ and a resonant tank connected to an output of the second switching bridge, the second switching bridge configured to generate a resonator output voltage;
a transformer configured to transform the resonator output voltage to a transformed output voltage; and
a rectifier configured to rectify the transformed output voltage to an output voltage $V_{out}$;
wherein a duty cycle of the first switching bridge is based on a current derived from a value of the output voltage $V_{out}$; and
wherein a switching frequency of the second switching bridge is a fixed frequency and a duty cycle of the second switching bridge is fixed at 50:50.

2. The power converter topology of claim 1, wherein the first converter stage comprises a buck PWM converter.

3. The power converter topology of claim 1, wherein the first converter stage comprises a boost PWM converter.

4. The power converter topology of claim 1, wherein the switching stage is a half-bridge switching stage.

5. The power converter topology of claim 1, wherein the switching stage is a full-bridge switching stage.

6. The power converter topology of claim 1, wherein the resonant tank is an LLC resonant tank.

7. The power converter topology of claim 1, wherein the rectifier comprises two semiconductor switches.

8. The power converter topology of claim 1, wherein the rectifier comprises four semiconductor switches.

9. The power converter topology of claim 7, wherein the semiconductor switches are MOSFETs.

10. A power distribution circuit comprising:
a power supply;
one or more loads configured to be provided with power from the power supply; and
a power converter as claimed in claim 1 and configured to convert power from the power supply to power for the one or more loads.

11. The power distribution circuit of claim 10, wherein the power distribution circuit represents a power distribution circuit on an aircraft.

12. A method of operating a power converter, comprising:
providing a cascade connection of a first converter stage and a second converter stage, wherein:
the first converter stage comprises a current mode controlled pulse width modulation (PWM) converter having one or more pairs of switches forming a first switching bridge and an inductor connected to an output of the first switching bridge, the first switching bridge configured to generate a voltage $V_{link}$; and the second converter stage comprises a resonant converter with a switching stage having one or more pairs of switches forming a second switching bridge across the voltage $V_{link}$ and a resonant tank connected to an output of the second switching bridge, the second switching bridge configured to generate a resonator output voltage;

providing a transformer configured to transform the resonator output voltage to a transformed output voltage;

providing a rectifier configured to rectify the transformed output voltage to an output voltage $V_{out}$; and varying a duty cycle of the first switching bridge based on a current derived from a value of the output voltage $V_{out}$, wherein a switching frequency of the second switching bridge is a fixed frequency and a duty cycle of the second switching bridge is fixed at 50:50.

13. The method of claim 12, wherein the first converter stage comprises a buck PWM converter.

14. The method of claim 12, wherein the first converter stage comprises a boost PWM converter.

15. The method of claim 12, wherein the switching stage is a half-bridge switching stage.

16. The method of claim 12, wherein the switching stage is a full-bridge switching stage.

17. The method of claim 12, wherein the rectifier comprises two semiconductor switches.

18. The method of claim 12, wherein the rectifier comprises four semiconductor switches.

19. The method of claim 17, wherein the semiconductor switches are MOSFETs.

20. The method of claim 12, further comprising:

providing power from a power supply to the power converter; and converting the power from the power supply via the power converter into power for one or more loads.

* * * * *